(12) United States Patent
Song

(10) Patent No.: US 9,932,481 B2
(45) Date of Patent: Apr. 3, 2018

(54) ACTUATABLE MICROSTRUCTURES AND METHODS OF MAKING THE SAME

(71) Applicant: The Boeing Company, Chicago, IL (US)

(72) Inventor: Weidong Song, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 248 days.

(21) Appl. No.: 14/692,522

(22) Filed: Apr. 21, 2015

(65) Prior Publication Data

US 2016/0312035 A1    Oct. 27, 2016

(51) Int. Cl.
| | |
|---|---|
| *C09D 5/00* | (2006.01) |
| *B63G 8/00* | (2006.01) |
| *F15D 1/00* | (2006.01) |
| *F15D 1/12* | (2006.01) |
| *B63B 1/34* | (2006.01) |
| *B64C 21/10* | (2006.01) |

(52) U.S. Cl.
CPC ............ *C09D 5/00* (2013.01); *B63B 1/34* (2013.01); *B63G 8/00* (2013.01); *B64C 21/10* (2013.01); *F15D 1/004* (2013.01); *F15D 1/006* (2013.01); *F15D 1/0085* (2013.01); *F15D 1/12* (2013.01); *B64C 2230/26* (2013.01); *Y02T 70/121* (2013.01)

(58) Field of Classification Search
CPC ........... C09D 5/00; B63G 8/00; F15D 1/0085; F15D 1/006; F15D 1/12; F15D 1/004; B64C 21/10; B64C 2230/26; B63B 1/34; B32B 3/00; B32B 3/12; B32B 3/20; B32B 3/30

See application file for complete search history.

(56) References Cited

U.S. PATENT DOCUMENTS

| | | | |
|---|---|---|---|
| 5,191,791 A | * | 3/1993 | Gerardi ................. B64D 15/16 73/178 R |
| 5,884,871 A | | 3/1999 | Fedorov et al. |
| 6,123,296 A | * | 9/2000 | Mangalam ............. B64C 21/10 244/130 |

(Continued)

FOREIGN PATENT DOCUMENTS

| | | |
|---|---|---|
| JP | H08268377 | 10/1996 |
| WO | 03089295 | 10/2003 |

(Continued)

OTHER PUBLICATIONS

Pokroy et al., 2009, Advanced Materials, 21, 463-469, Fabrication of Bioinspired Actuated Nanostructures with Arbitrary Geometry and Stiffness.*

(Continued)

*Primary Examiner* — Nathan L Van Sell
(74) *Attorney, Agent, or Firm* — Hanley, Flight & Zimmerman, LLC

(57) ABSTRACT

Actuatable microstructures and methods of making the same are disclosed. An example a sheet includes a first side including an elastomeric material and a second side opposite the first side. The sheet defines sealed channels. In response to a pressure differential across the elastomeric material, the elastomeric material is to be in a deformed position relative to the sealed channels to define microstructures.

24 Claims, 13 Drawing Sheets

(56) References Cited

U.S. PATENT DOCUMENTS

| | | | |
|---|---|---|---|
| 6,345,791 B1 | 2/2002 | McClure | |
| 7,955,644 B2* | 6/2011 | Sansom | B29C 70/64 |
| | | | 427/214 |
| 8,074,938 B2* | 12/2011 | Hyde | B64C 21/10 |
| | | | 244/130 |
| 8,292,226 B2 | 10/2012 | Sankrithi et al. | |
| 8,409,691 B1* | 4/2013 | Henry | B32B 5/028 |
| | | | 428/174 |
| 8,413,928 B2 | 4/2013 | Rawlings et al. | |
| 8,668,166 B2 | 3/2014 | Rawlings et al. | |
| 8,678,316 B2 | 3/2014 | Rawlings et al. | |
| 8,684,310 B2 | 4/2014 | Rawlings et al. | |
| 8,733,702 B1 | 5/2014 | Rawlings et al. | |
| 8,876,052 B2 | 11/2014 | Rawlings et al. | |
| 2003/0047645 A1* | 3/2003 | Rastegar | F42B 10/146 |
| | | | 244/3.24 |
| 2005/0115443 A1* | 6/2005 | Rastegar | F42B 10/146 |
| | | | 102/400 |
| 2005/0133661 A1* | 6/2005 | Rastegar | F42B 10/146 |
| | | | 244/3.24 |
| 2005/0133668 A1* | 6/2005 | Rastegar | F42B 10/146 |
| | | | 244/130 |
| 2008/0061192 A1* | 3/2008 | Sullivan | B64C 21/10 |
| | | | 244/200 |
| 2008/0145616 A1* | 6/2008 | Gharib | B29C 70/64 |
| | | | 428/156 |
| 2009/0250129 A1* | 10/2009 | Bernitsas | F03B 17/06 |
| | | | 137/808 |
| 2010/0018322 A1* | 1/2010 | Neitzke | F15D 1/12 |
| | | | 73/861.22 |
| 2010/0187359 A1 | 7/2010 | Rawlings et al. | |
| 2010/0187360 A1 | 7/2010 | Rawlings et al. | |
| 2010/0187361 A1 | 7/2010 | Rawlings et al. | |
| 2010/0200697 A1 | 8/2010 | Sankrithi et al. | |
| 2010/0282909 A1 | 11/2010 | Rawlings et al. | |
| 2011/0073710 A1 | 3/2011 | Rawlings et al. | |
| 2011/0186685 A1 | 8/2011 | Tsotsis et al. | |
| 2011/0192233 A1* | 8/2011 | Aizenberg | B29C 39/026 |
| | | | 73/861 |
| 2012/0021164 A1* | 1/2012 | Sansom | B29C 70/64 |
| | | | 428/95 |
| 2013/0062004 A1 | 3/2013 | Amirehteshami et al. | |
| 2013/0156595 A1 | 6/2013 | Sander et al. | |
| 2013/0193270 A1 | 8/2013 | Rawlings et al. | |
| 2014/0099475 A1 | 4/2014 | Rawlings et al. | |
| 2014/0174642 A1 | 6/2014 | Rawlings et al. | |
| 2014/0186180 A1 | 7/2014 | Neitzke et al. | |
| 2014/0248469 A1 | 9/2014 | Rawlings et al. | |
| 2014/0295143 A1 | 10/2014 | Rawlings et al. | |
| 2014/0332631 A1 | 11/2014 | Rawlings et al. | |

FOREIGN PATENT DOCUMENTS

| | | |
|---|---|---|
| WO | 2009000703 | 12/2008 |
| WO | 2010060042 | 5/2010 |

OTHER PUBLICATIONS

Saranadhi, D.V., Oct. 1, 2015, Passive and Active Approaches to Sustained Turbulent Hydrodynamic Drag Reduction using Superhydrophobic Surfaces, Master's Thesis, M.I.T.*

Mani et al, Active Skin for Turbulent Drag Reduction, Date Unknown,Aerospace Engineering Department, Texas A&M University.*

Lang et al, Jun. 21, 2014,Movable shark scales act as a passive dynamic micro-roughness to control flow separation,Bioinspiration & Biomimetics.*

Terwagne et al, 2014,Smart Morphable Surfaces for Aerodynamic Drag Control, Advanced Materials.*

3M "3M Solar Energy," [http://solutions.3m.com/wps/portal/3M/en_US/Renewable/Energy], accessed on Apr. 21, 2015, 1 page.

3M, "3M Reveals Successful Collaboration with BMW ORACLE Racing for 33rd America's Cup Match," [http://news.3m.com/press-release/company/3m-reveals-successful-collabration-bmw-oracle-racing-33rd-americas-cup-match], published on Feb. 24, 2010, 2 pages.

NASA, "NASA Riblets for Stars & Stripes," [http://www.nasa.gov/centers/langley/news/factsheets/Riblets_prt.htm], published Oct. 1993, 2 pages.

Agrim Sareen, "Drag Reduction Using Riblet Film Applied to Airfoils for Wind Turbines," Thesis for Degree of Master of Science in Aerospace Engineering in the Graduate College of the University of Illinois at Urbana-Champaign, 2012, 255 pages.

St. Anthony Falls Laboratory, "Featured Research Project: Reducing Wind Turbine Blade Drag Using Riblet Film," [http://www.safl.umn.edu/featured-story/featured-research-project-reducing-wind-turbine-blade-drag-using-riblet-film], accessed on Apr. 21, 2015, 3 pages.

Brian Douglas Dean, "The Effect of Shark Skin Inspired Riblet Geometries on Drag in Rectangular Duct Flow," Thesis for Degree of Master of Science in the Graduate School of The Ohio State University, 2011, 86 pages.

Jessy Lin, "Drag Reduction with Riblet Film," [https://prezi.com/1kixl75xfh8g/drag-reduction-with-riblet-film/], published on Jan. 8, 2013, 2 pages.

"KISS Complete's Mechanisms of Drag-Reduction," [http://www.kisspolymers.com/Science/dragreduction.htm], accessed on Apr. 21, 2015, 2 pages.

European Patent Office, "Extended European Search Report," issued in connection with European Patent Application No. 16163273.2, dated Sep. 28, 2016, 8 pages.

Han et al., "Fabrication of a Micro-Riblet Film and Drag Reduction Effects on Curved Objects," IEEE, The 12th International Conference on Solid State Sensors, Actuators and Microsystems, Jun. 6-12, 2003, 4 pages.

* cited by examiner

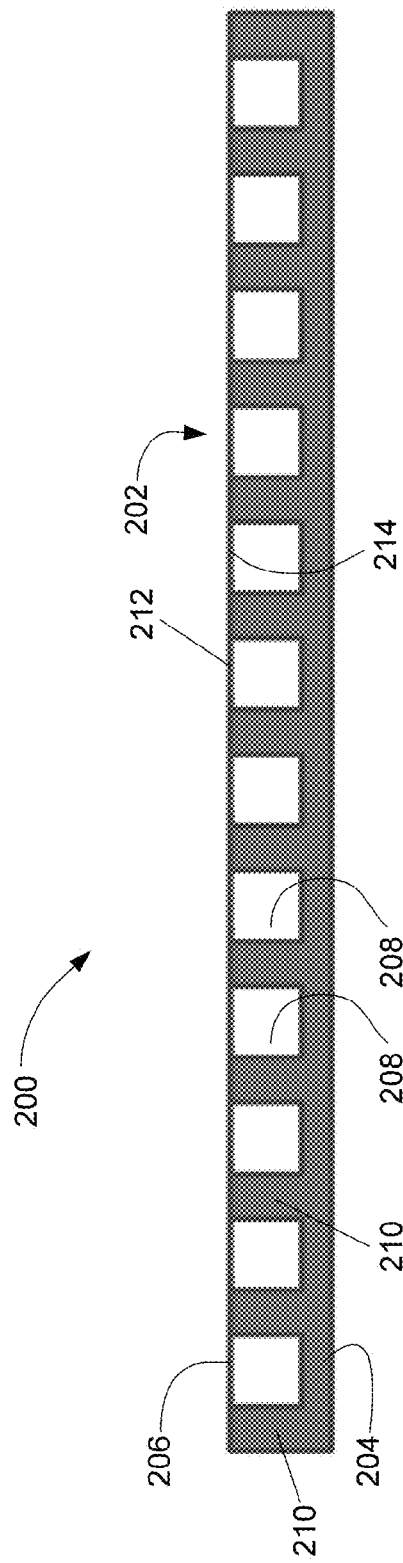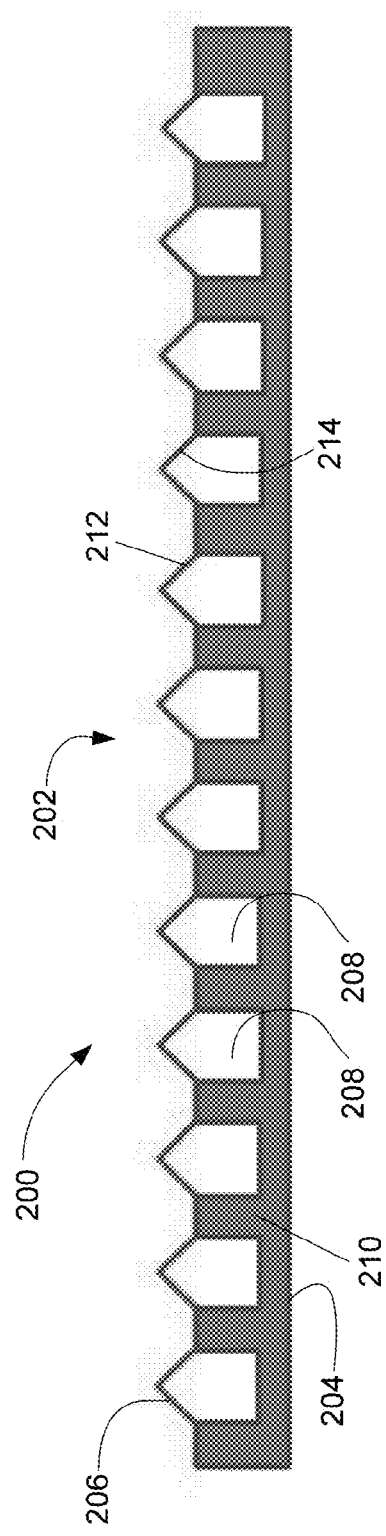
FIG. 2
FIG. 3

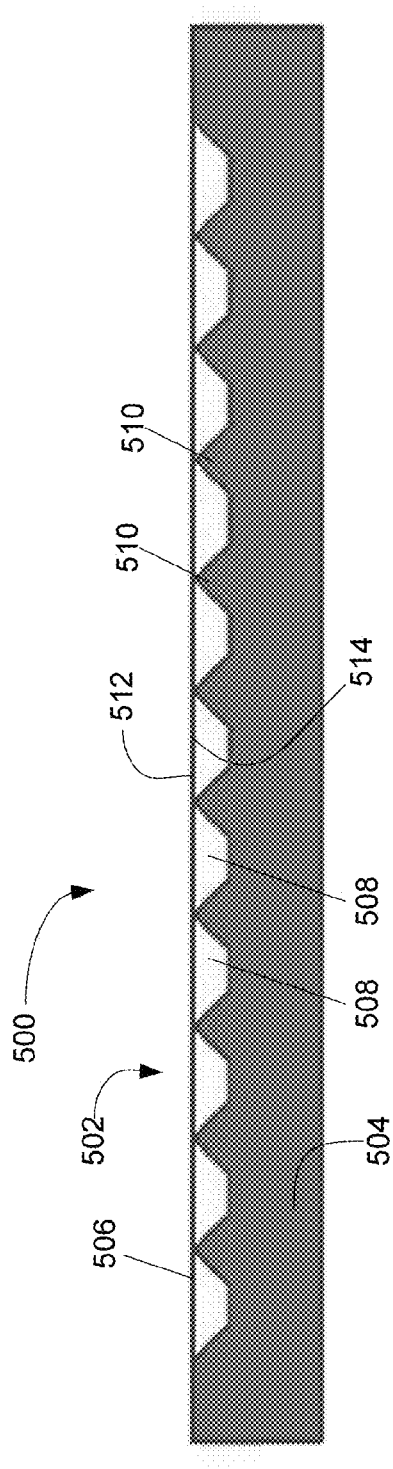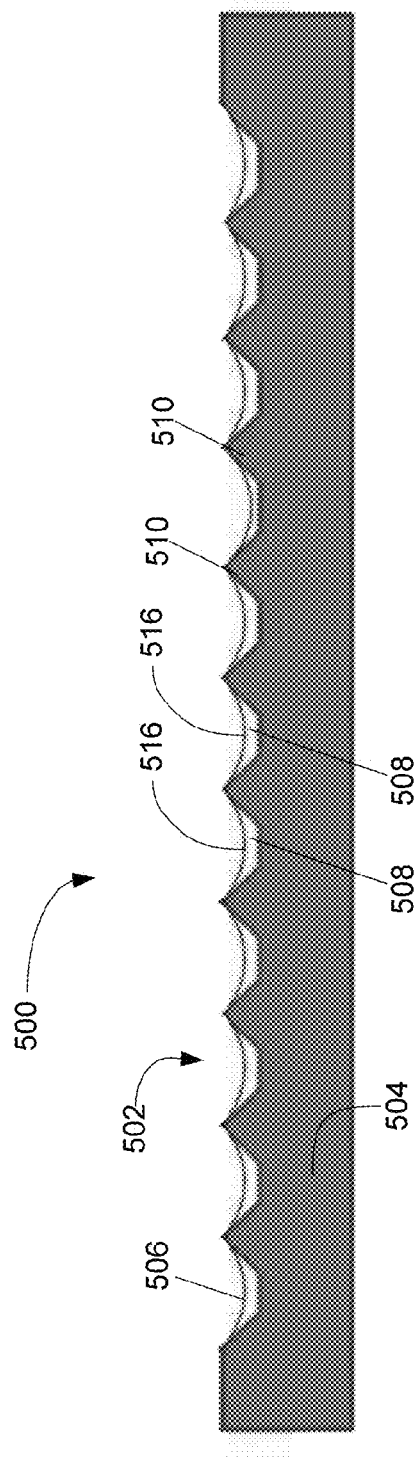

ACTUATABLE MICROSTRUCTURES AND METHODS OF MAKING THE SAME

FIELD OF THE DISCLOSURE

This disclosure relates generally to microstructures and, more particularly, to actuatable microstructures and methods of making the same.

BACKGROUND

In some instances, microstructures may be applied to aerodynamic surfaces to reduce drag and fuel usage. In some examples, these microstructures are applied to different structures of an aircraft.

BRIEF DESCRIPTION OF THE DRAWINGS

FIG. 2 illustrates an example sheet including example microstructures in a non-deployed position that can be used to implement the aircraft of FIG. 1.

FIG. 3 illustrates the example sheet of FIG. 2 including the example microstructures in a deployed position.

FIG. 5 illustrates an example sheet including example microstructures disposed in a non-deployed position that can be used to implement the submarine of FIG. 4.

FIG. 6 illustrates the example sheet of FIG. 5 including the example microstructures in a deployed position.

The figures are not to scale. Wherever possible, the same reference numbers will be used throughout the drawing(s) and accompanying written description to refer to the same or like parts.

DETAILED DESCRIPTION

Figure 1:
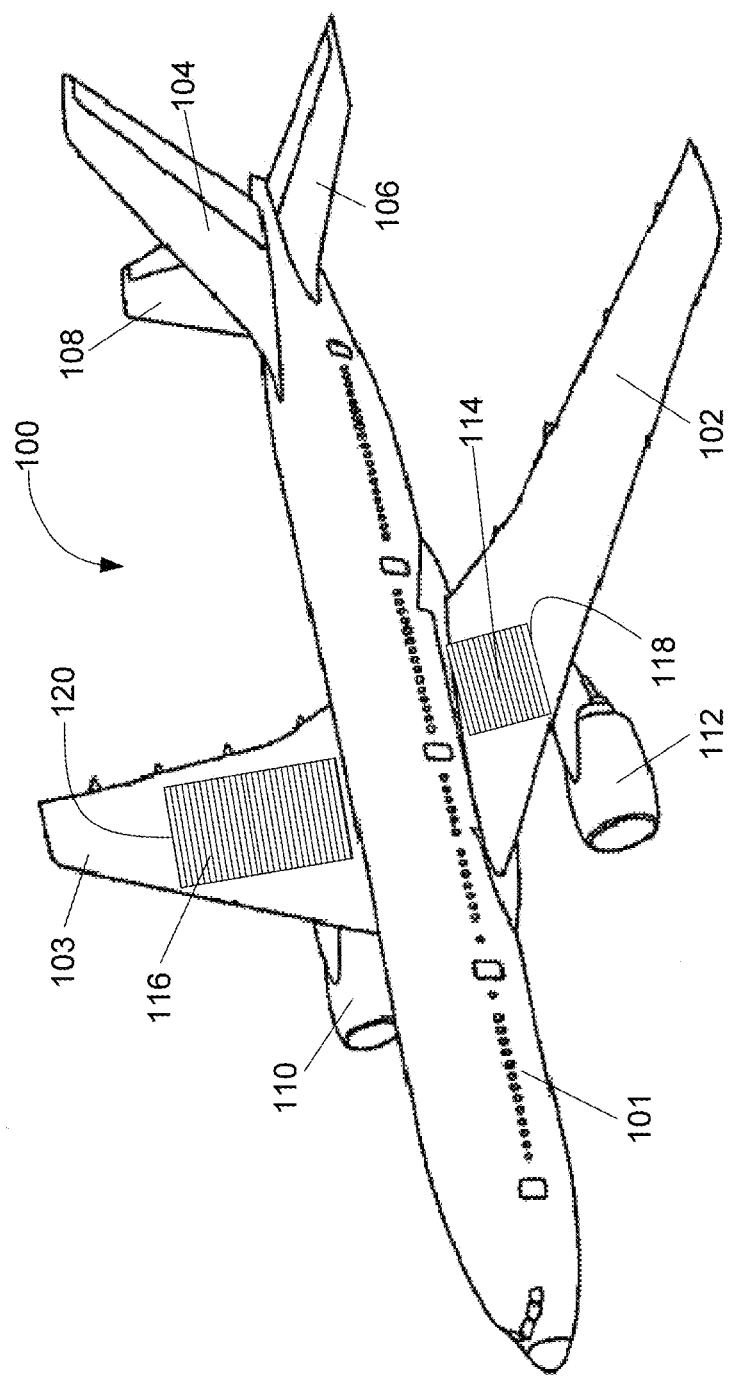
FIG. 1 illustrates an example aircraft on which the example actuatable microstructures can be implemented.

The examples disclosed herein relate to example acutatable microstructures that are self-deployable and/or passively-actuatable. In other words, in some examples, the example actuatable microstructures are actuatable without the use of a mechanical actuator.

In some examples, the example actuatable microstructures are implemented on fluid dynamic surfaces of a vehicle to alter and/or improve fluid flow characteristics over the fluid dynamic surfaces of the vehicle. Thus, vehicles implemented with the example actuatable microstructures disclosed herein reduce the overall drag, the fuel consumption and carbon-dioxide emissions of the vehicle. The vehicle may be an aircraft (e.g., an airplane, a helicopter, etc.), a watercraft (e.g., a boat), an underwater craft (e.g., a submarine) and/or any other suitable vehicle (e.g., a land based vehicle).

In some examples, the actuatable microstructures are actuatable riblets formed on an example film(s) and/or a layer(s). The film may include an adhesive film and/or an adhesive layer that is to be affixed to a surface of the vehicle. To enable the actuation of the example riblets, the film defines a channel(s) and/or micro-channel(s) that is sealed (e.g., hermetically sealed) from the environment and partially defined by an outwardly facing elastomeric film.

In some examples, the film includes a plurality of channels that are positioned substantially parallel to one another. In some examples, the film is made of two layers where the first layer is a base layer that at least partially defines the channels and the second layer is the outwardly facing elastomeric film. In other examples, the film is a single layer that defines the channels therein. To form the channels of the single layer example, a foaming agent may be embedded and/or implanted within the film that is activated to form the respective channels. In some examples, the channel(s) is sealed at ground level such that when the channel(s) is formed, the pressure within the channel(s) is approximately at ground level atmospheric pressure (e.g., 101 kilopascal (kPa)).

In examples where the example film is implemented on an aircraft positioned on the ground, the force acting against the outwardly facing elastomeric film by the ambient air is approximately the same as an opposing force acting against the elastomeric film from the gas (e.g., air) contained within the channel (e.g., the pressure differential is approximately zero). However, when the aircraft ascends to, for example, 8000 feet (ft.), the atmospheric pressure and the force acting against the outwardly facing elastomeric film from the ambient air significantly decreases. The decrease in the force imparted by the ambient air enables the riblet(s) to be deployed because, for example, a pressure differential exists across the riblet. In other words, at an altitude of 8000 ft., a pressure differential across the outwardly facing elastomeric film enables the riblet(s) to deploy. Additionally or alternatively, in some examples, a temperature change may cause and/or enhance deployment of the riblet(s) and/or enable the channels to be defined. In some examples, when the riblets are deployed, debris on the outwardly facing elastomeric film is discarded enabling the example riblets to be substantially self-cleaning and for the drag reduction (e.g., the efficiency of the example riblets) to be substantially maintained throughout a flight of an aircraft and/or the relative life of the example riblets. In some examples, based on the structure of the example actuatable microstructures, the example microstructures disclosed herein are more durable and/or have a longer usable life as compared to some microstructures that are not actuatable. In some examples, the example riblets gradually deploy as the aircraft ascends. In some examples, the example riblets actuate to the deployed position when a predetermined pressure differential exists across the riblet.

In examples where the example film is implemented on a submarine at the surface (e.g., the submarine is not fully submerged under water or the submarine is adjacent the surface of the water), a force acting against the outwardly facing elastomeric film from the ambient air or water is approximately the same as an opposing force acting against the elastomeric film from the gas (e.g., air) contained within the channel (e.g., the pressure differential is approximately zero). However, when the submarine descends, for example, 1000 feet (ft.) below sea level, the atmospheric pressure and the force acting against the outwardly facing elastomeric film from the ambient water significantly increases. The increase in the force imparted by the ambient water causes the riblet(s) to be deployed. In such examples, the riblets are deployed when the outwardly facing elastomeric film deforms inwardly toward the base film such that the base film at least partially defines the peaks of the riblets and the center of the channels define the valleys of the respective riblets. In other words, when the submarine descends 1000 ft. below sea level, a pressure differential across the outwardly facing elastomeric film enables the riblet(s) to deploy. In some examples, based on the structure of the example actuatable microstructures, the example microstructures disclosed herein are more durable and/or have a longer usable life as compared to some microstructures that are not actuatable.

FIG. 1 illustrates an example aircraft 100 (e.g., a vehicle) on which the examples disclosed herein can be implemented. In this example, the aircraft 100 is an airplane. However, in other examples, the aircraft 100 can be implemented as a helicopter or any other type of aircraft.

The example aircraft 100 of FIG. 1 includes a fuselage 101 to which wings 102, 103, a vertical stabilizer 104 and horizontal stabilizers 106, 108 are coupled. Engines 110, 112 are coupled to the wings 102, 103. To reduce the drag of the aircraft 100, in this example, sheets 114, 116 including example actuatable microstructures and/or riblets 118, 120 are coupled to the wings 102, 103. The sheets 114, 116 may include adhesive to affix and/or couple the sheets 114, 116 to the wings 102, 103. Additionally or alternatively, the sheets 114, 116 may be formed (e.g., integrally formed) as a layer of the respective wings 102, 103. While the sheets 114, 116 are illustrated as being coupled to the wings 102, 103 and as having a particular shape, the sheets 114, 116 and/or the actuatable microstructures and/or riblets 118, 120 may be formed on any other surface of the aircraft 100, the sheets 114,116 may have any other suitable shape and/or the microstructures 118, 120 may be disposed in any other suitable orientation and/or pattern. For example, the sheets 114, 116 and/or the actuatable microstructures and/or riblets 118, 120 may be formed on and/or coupled to the fuselage 101, the vertical stabilizer 104, the horizontal stabilizers 106, 108 and/or the engines 110, 112.

FIGS. 2 and 3 illustrate an example sheet(s) 200 including actuatable microstructures and/or riblets 202 that can be used to implement the example sheets 114, 116 and the example microstructures 118, 120 of FIG. 1. FIG. 2 illustrates the example riblets 202 in a non-deployed position and FIG. 3 illustrates the example riblets 202 in a fully deployed position. However, in some examples and depending on the pressure differential across the riblets 202, the riblets 202 may be partially deployed and/or may be transitioning between the non-deployed position and the fully deployed position.

In the illustrated example of FIGS. 2 and 3, the sheet 200 includes a first layer and/or base layer 204 and a second layer and/or top layer 206 that together define channels 208. The channels 208 may be substantially parallel to one another and run along a length (e.g., an entire length) of the sheet 200. As set forth herein, the phrase substantially parallel means within about 3 degrees of parallel and/or accounts for manufacturing tolerances.

In examples where the base layer 204 is a separate layer from the second layer 206, the base layer 204 partially defines the channels 208 and is formed prior to the second layer 206 being coupled to the base layer 204 to hermitically seal the channels 208. In some examples and as shown in FIG. 2, when the second layer 206 is coupled to the base layer 204, the second layer 206 is substantially flat relative to and does not dip below walls 210 of the base layer 204 defining the channels 208. In other examples, when the second layer 206 is coupled to the base layer 204, portions of the second layer 206 dip below the walls 210 and/or are at least partially recessed into the channels 208 (See FIG. 10). The layers 204, 206 may be coupled together in any suitable way including using thermal welding, plastic welding, adhesive, etc.

In examples where the base layer 204 is integral to the second layer 206, in some examples, the channels 208 are formed by embedding and/or implanting a foaming agent into the sheet 200 that is later activated to form the channels 208. In some such examples, the foaming agent in embedded and/or implanted in the sheet 200 in a pattern (e.g., relatively straight lines) that corresponds to a pattern of the channels 208 being formed. The foaming agent may be activated by exposing the sheet 200 to heat, chemical forces and/or other factors to cause gas to be released within the sheet 200 and for the respective hermetically sealed channels 208 to be formed. In some examples, the foaming agent that is used to implement the examples disclosed herein is DOW™ LDPE 6211. However, any other suitable foaming agent and/or blowing agent may be used instead.

Regardless of whether the sheet 200 is formed by two separately coupled layers 202, 206 or if the sheet 200 is formed of a single layer, in some examples, the channels 208 are sealed at ground level such that when the channels 208 are formed, the pressure within the channels 208 is approximately at ground level atmospheric pressure (e.g., 101 kilopascal (kPa)). In operation, when the sheet 200 is used to implement the sheets 114, 116 on the aircraft 100 and the aircraft 100 is on the ground, the force acting against a first side 212 of the second layer 206 from the ambient air is approximately the same as an opposing force acting against a second side 214 of the second layer 206 from the gas (e.g., air) contained within the channels 208. The substantially similar opposing forces acting on the second layer 206 causes the riblets 202 to be in a non-deployed position and/or a non-deformed position. As used herein, the phrase substantially similar opposing forces means that the pressure differential across a layer (e.g., the second layer 206) is not great enough to enable the riblets (e.g., the riblets 202) to deploy, below a threshold value and/or substantially zero.

However, as shown in FIG. 3, when the aircraft 100 ascends to, for example, 8000 feet (ft.), the atmospheric pressure and the force acting against the first side 212 from the ambient air significantly decreases. The decrease in the force imparted by the ambient air against the first side 212 enables the riblets 202 to be deployed. In other words, at an altitude of 8000 ft., a pressure differential across the second layer 206 enables the riblets 202 to deploy.

Figure 4:
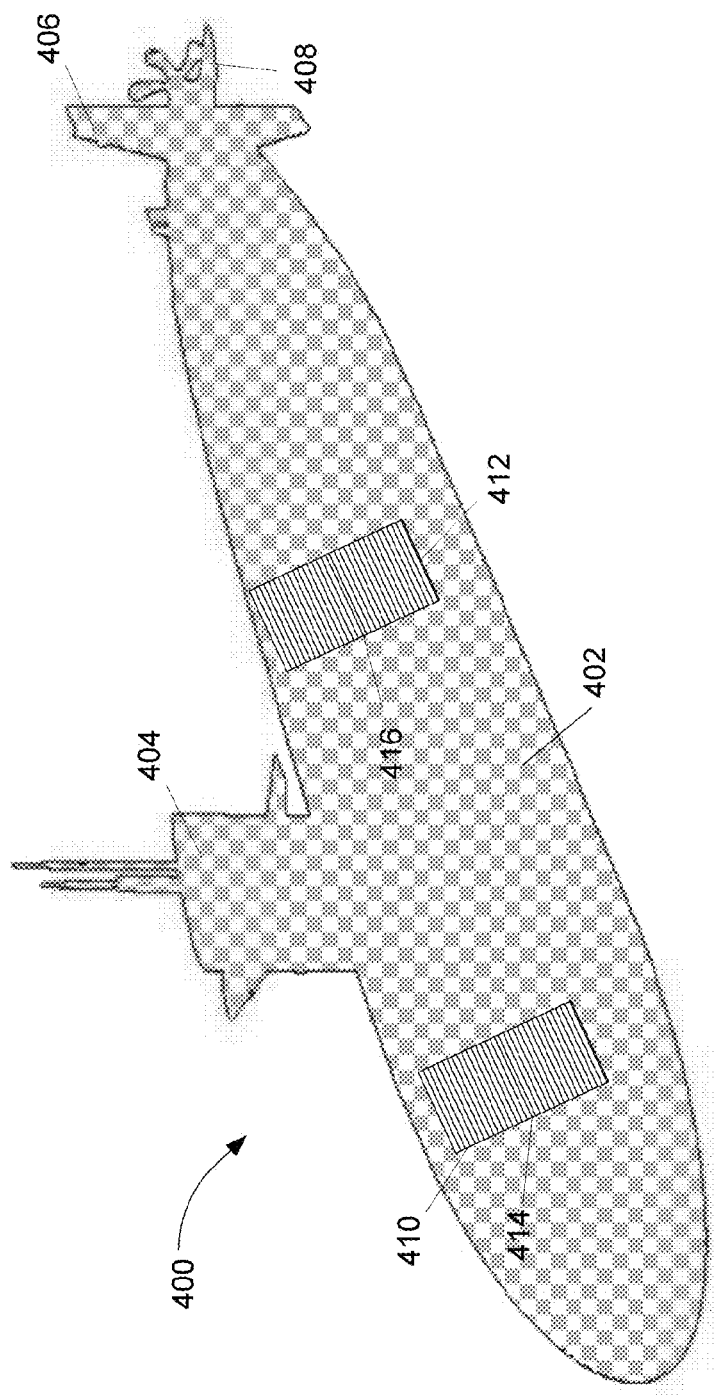
FIG. 4 illustrates an example submarine on which the example actuatable microstructures can be implemented.

FIG. 4 illustrates an example underwater craft 400 (e.g., a vehicle) on which the examples disclosed herein can be implemented. In this example, the underwater craft 400 is implemented as a submarine. However, in other examples, the underwater craft 400 can be implemented by any other vehicle.

The example submarine 400 of FIG. 4 includes a body 402 to which a sail 404, a rudder 406 and stern planes 408 are coupled. To reduce the drag of the submarine 400, in some examples, sheets 410, 412 including example actuatable microstructures and/or riblets 414, 416 are coupled to the body 402. The sheets 114, 116 may include adhesive (e.g., pressure sensitive adhesive, epoxy-based adhesive) to affix and/or couple the sheets 410, 412 to the body 402. Alternatively, the sheets 410, 412 may be formed (e.g., integrally formed) as a layer of the body 402. While the sheets 410, 412 are illustrated as being coupled to the body 402, the sheets 410, 412 and/or the actuatable microstructures and/or riblets 414, 416 may be formed on any other surface of the submarine 400 and/or have any other suitable shape and/or be disposed in any other suitable orientation and/or pattern. For example, the sheets 410, 412 and/or the actuatable microstructures and/or riblets 414, 416 may be formed on the sail 404, the rudder 406 and/or the stern planes 408.

FIGS. 5 and 6 illustrate an example sheet(s) 500 including actuatable microstructures and/or riblets 502 that can be used to implement the example sheets 410, 412 and the example microstructures 414, 416 of FIG. 4. FIG. 5 illustrates the example riblets 502 in a non-deployed position and FIG. 6 illustrates the example riblets 602 in a deployed position.

In the illustrated example of FIGS. 5 and 6, the sheet 500 includes a first layer and/or base layer 504 and a second layer and/or top layer 506 that together define channels 508. The channels 508 may be substantially parallel to one another and run along the length of the sheet 500. However, the channels 508 may be arranged in any desirable pattern. While each of the channels 508 is shown having a substantially similar cross-section, in other examples, two or more of the channels 508 may have different cross-sections. For example, some of the channels 508 may have a first width and some channels 508 may have a second width different than the first width. Additionally or alternatively, some of the channels 508 may have a first cross-section (e.g., a saw tooth cross-section), some of the channels 508 may have a second cross-section (e.g., a scalloped cross-section) and/or some of the channels 508 have a third cross-section (e.g., a blade cross-section).

In examples where the base layer 504 is separate from the second layer 506, the base layer 504 partially defining the channels 508 is formed prior to the second layer 506 being coupled to the base layer 504 to hermitically seal the channels 508. In this example, the portion of the channel 508 defined by the base layer 504 has a trapezoidal shape to enable peaks 510 of the riblets 502 to be formed when the riblets 502 are deployed. However, the channels 508 may have any suitable configuration.

To form the channels 508, in some examples, the channels 508 are sealed at ground level such that when the channels 508 are formed, the pressure within the channels 508 is approximately at ground level atmospheric pressure (e.g., 101 kilopascal (kPa)). In operation, when the sheet 500 is used to implement the sheets 410, 412 on the submarine 400 and the submarine 400 is at the surface of the water, the force acting against a first side 512 of the second layer 506 from the ambient air and/or water is approximately the same as an opposing force acting against a second side 514 of the second layer 506 from the gas (e.g., air) contained within the channel 508. The substantially similar opposing forces acting on the second layer 506 causes the riblets 502 to be in the non-deployed position. However, as shown in FIG. 6, when the submarine 400 descends to, for example, 1000 feet (ft.) below sea level, the ambient water pressure and the force acting against the first side 512 significantly increases. The increase in the force imparted by the ambient water causes the riblets 502 to be deployed such that the peaks 510 of the riblets 502 are at least partially defined by the first layer 504 and valleys 516 of the riblets 502 are at least partially defined by the second layer 506 between the peaks 510. In some examples, based, at least in part, on the rigidity of the base layer 504, the second layer 506 may contact the base layer 504 at a relatively low pressure differential and as the pressure differential increases to define the riblets 502.

Flowcharts representative of example methods for producing the example sheets 114, 116, 200, 410, 412, 500 and, more generally, the examples disclosed herein are shown in FIGS. 7-11. The example method may be implemented using machine readable instructions that comprise a program for execution by a processor such as the processor 1212 shown in the example processor platform 1500 discussed below in connection with FIG. 15. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1412 and/or embodied in firmware or dedicated hardware. Further, although the example program is described with reference to the flowcharts illustrated in FIGS. 7-11, many other methods of producing the examples disclosed herein may alternatively be used. For example, the order of execution of the blocks may be changed, and/or some of the blocks described may be changed, eliminated, or combined.

As mentioned above, the example method of FIGS. 7-11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIGS. 7-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 7:
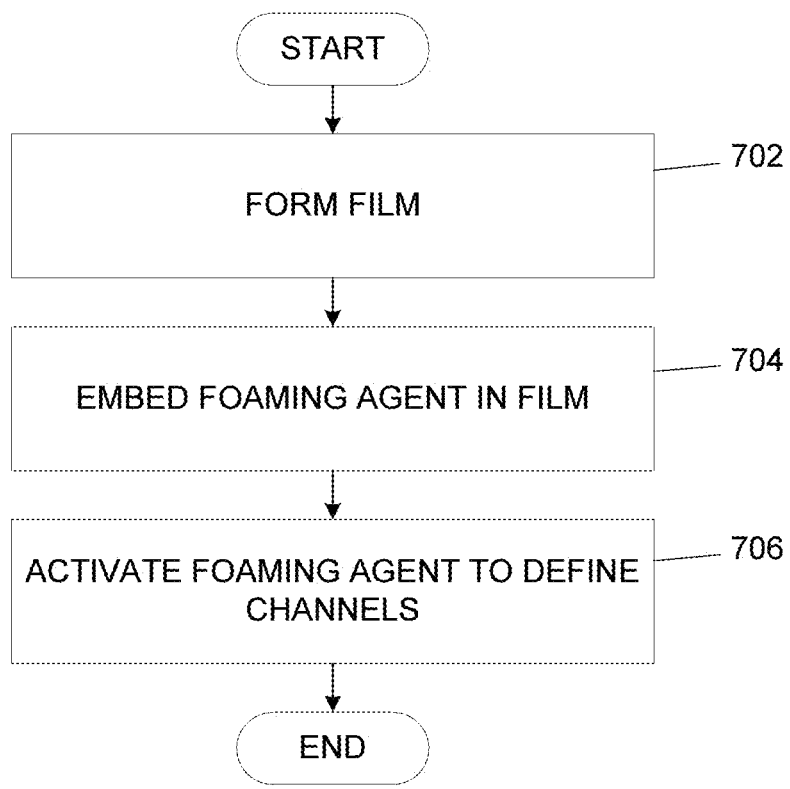
FIG. 7 is a flowchart representative of an example method that may be used to implement the examples disclosed herein.
Figure 8:
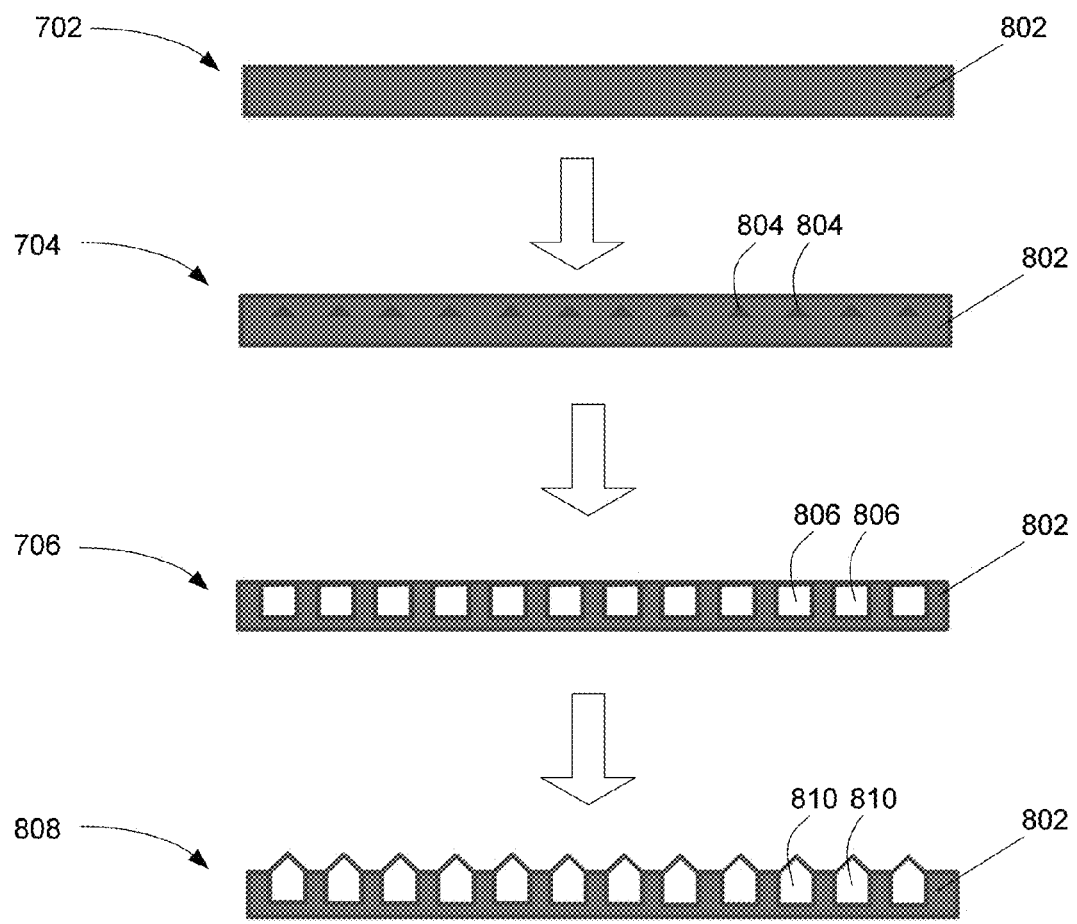
FIG. 8 is an example flow diagram that can be used to implement the example method of FIG. 7.

FIGS. 7 and 8 will be described in combination where FIG. 7 shows a method and FIG. 8 shows a flow diagram corresponding to the method of FIG. 7. The method of FIG. 7 begins by forming a film (block 702) such as, for example, the sheets 114, 116, 200, 410, 412, 500 and/or 802 of FIGS. 1-6 and 8. A foaming agent is embedded within the film (block 704) by, for example, embedding and/or implanting a foaming agent 804 within the sheet 802 in substantially parallel rows and/or in a pattern along a length of the sheet 802. The placement of the foaming agent 804 corresponds to the locations where the actuatable microstructures and/or riblets are to be formed and/or fabricated (e.g, microfabricated). In some examples, the foaming agent 804 is premixed with another additive(s) and/or catalyst(s) before being embedded in the sheets 114, 116, 200, 410, 412, 500 and/or 802. The foaming agent is then activated (block 706) by, for example, exposing the sheets 114, 116, 200, 410, 412, 500 and/or 802 of FIGS. 1-6 and 8 to a catalyst that activates the foaming agent 804 and causes the foaming agent 804 to create gas within the sheets 114, 116, 200, 410, 412, 500 and/or 802 and form the channels 208, 508, 806 within the respective sheets 114, 116, 200, 410, 412, 500 and/or 802. In some examples, the foaming agent 804 is activated by exposing the sheets 114, 116, 200, 410, 412, 500 and/or 802 to heat and/or a chemical force, etc. to cause gas to be released. Referring to FIG. 8 and as shown at reference number 808, after the sheets 114, 116, 200, 410, 412, 500 and/or 802 have been formed, the example riblets 118, 120, 202, 414, 416, 502, 810 are actuatable when the sheets 114, 116, 200, 410, 412, 500 and/or 802 are exposed to a pressure differential. For example and as shown in FIG. 8, when the ambient pressure is lower than the pressure within channels 208, 806, the riblets 118, 120, 202, 808 are actuated and/or are in a deformed position. In some examples, the riblets 118, 120, 202, 208 deploy and/or actuate at an elevation of between about 6000-10,000 meters where the atmospheric pressure is between about 25-45 kPa and the pressure differential is between about 55-75 kPa.

Figure 9:
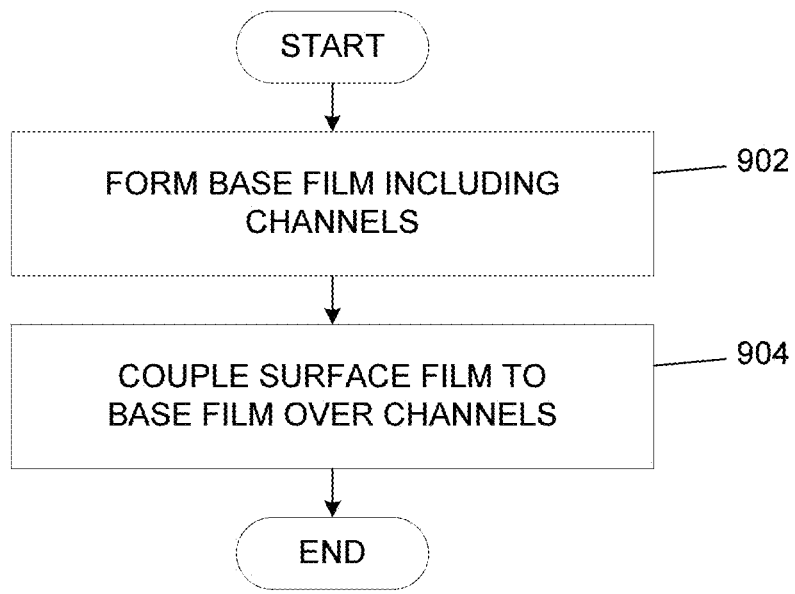
FIG. 9 is a flowchart representative of an example method that may be used to implement the examples disclosed herein.
Figure 10:
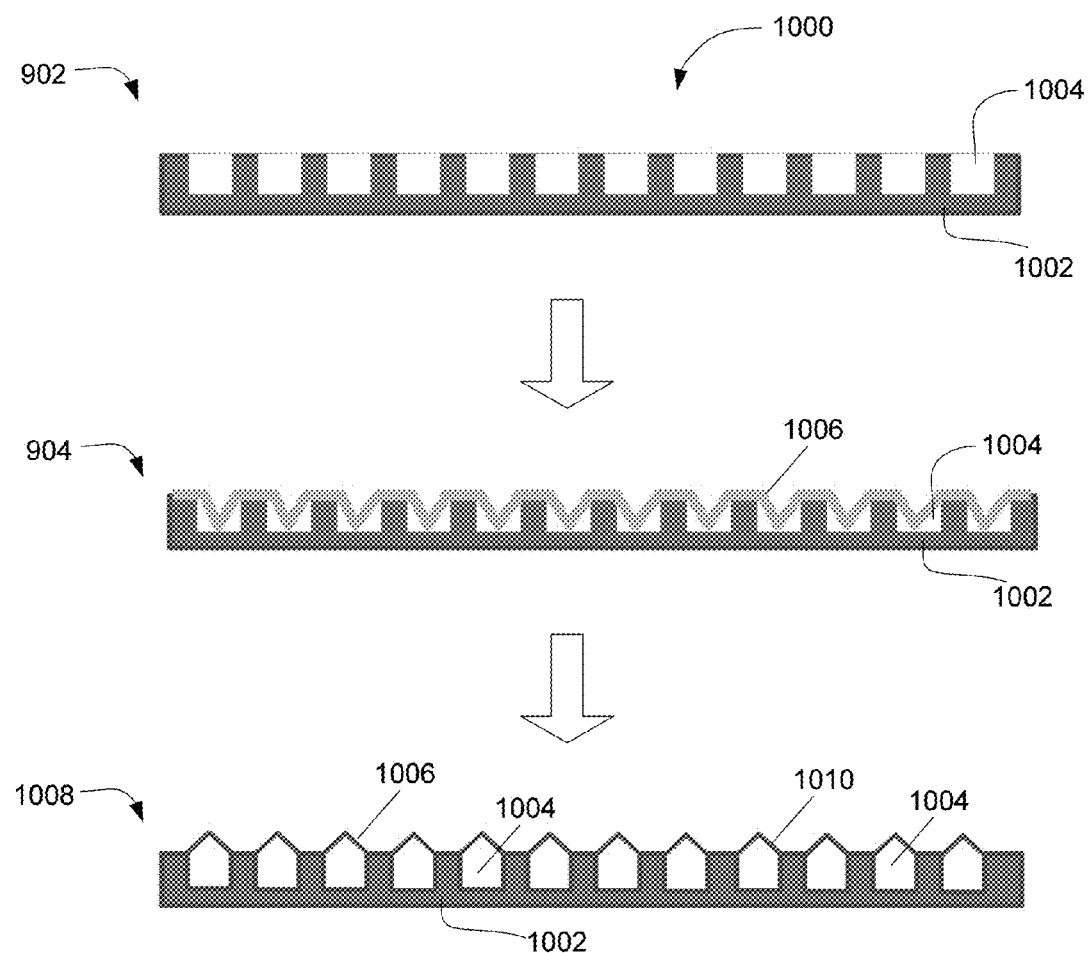
FIG. 10 is an example flow diagram that can be used to implement the example method of FIG. 9.
Figure 11:
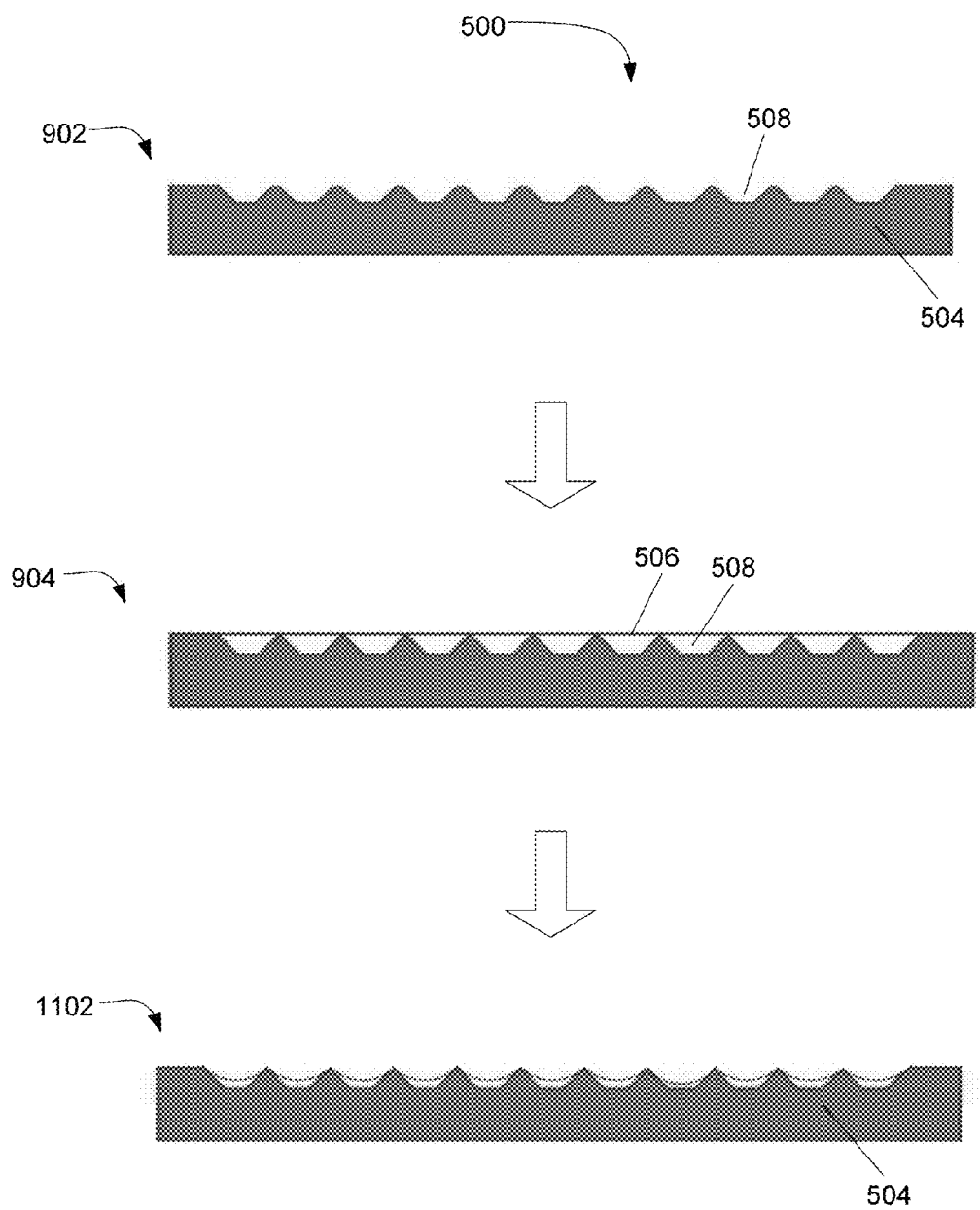
FIG. 11 is another example flow diagram that can be used to implement the example method of FIG. 9.

FIGS. 9, 10 and 11 will be described in combination where FIG. 9 shows a method and FIGS. 10 and 11 shows flow diagrams corresponding to the method of FIG. 9. The method of FIG. 9 begins by forming a base film including channels (block 902) such as, for example, the first layer 204, 504, 1002 and the channels 208, 508, 1004. In examples where the sheets formed are implemented on an aircraft, the channels 208, 1004 formed by the first layer 204, 1002 may have a first cross-section and in examples where the sheets formed are implemented on a submarine, the channels 508 formed may have a second cross-section. In some such examples, the first cross-section includes substantially 90-degree corners (e.g., plus or minus five degrees) as shown in FIGS. 2, 3 and 10 and the second cross-section includes corners disposed at an angle greater than 90-degrees relative to a bottom surface of the sheet as shown in FIGS. 5, 6 and 11. However, in other examples, the first cross-section and/or the second cross-section may have triangular cross-section, a U-shaped cross-section, a rectangular cross-section, etc. At block 904, a surface film is coupled to the base film (block 904) such as, for example, the second layer 206, 506, 1006 being coupled to the first layer 204, 504, 1002 to form the channels 208, 508, 1004.

Referring to FIG. 10 and as shown at reference number 1008, after the sheets 114, 116, 200, 1000 have been formed, the example riblets 118, 120, 202, 1010 are actuatable when the second layer 206, 506, 1006 is exposed to a pressure differential. For example and as shown in FIG. 10, when the ambient pressure is lower than the pressure within channels 208, 1004, the riblets 118, 120, 202, 1010 are actuated. In some examples, the riblets 118, 120, 202, 208 deploy and/or actuate at an elevation of between about 6000-10,000 meters where the atmospheric pressure is between about 25-45 kPa and the pressure differential is between about 55-75 kPa.

Referring to FIG. 11 and as shown at reference number 1102, after the sheets 410, 412, 500 have been formed, the example riblets 414, 416, 502 are actuatable when the sheets 410, 412 and/or 500 are exposed to a pressure differential. For example and as shown in FIG. 11, when the ambient pressure is significantly higher than the pressure within channels 508, the riblets 414, 416, 502 are defined and/or actuated.

Figure 12:
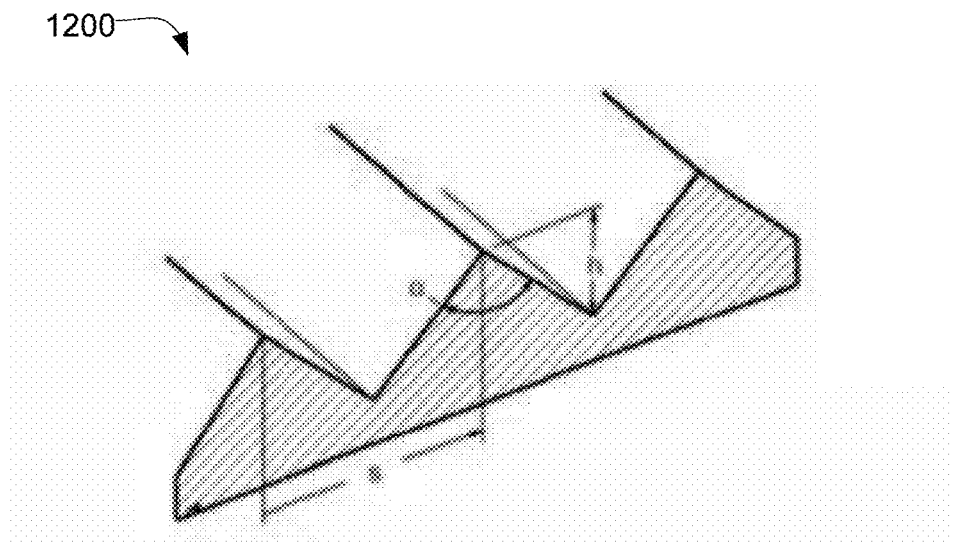
FIGS. 12-14 illustrate different example riblets that can be used to implement the examples disclosed herein.

FIG. 12 illustrates example saw tooth riblets 1200 that can be used to implement the example actuatable riblets disclosed herein. In this example, "s" refers to the distance between riblet peaks, "h" refers to the height of the riblet and "α" refers to the angle of the riblet. In some examples, "s" is between about 10 and 30 micrometer (μm) and "α" is between about 50° and 90°.

Figure 13:
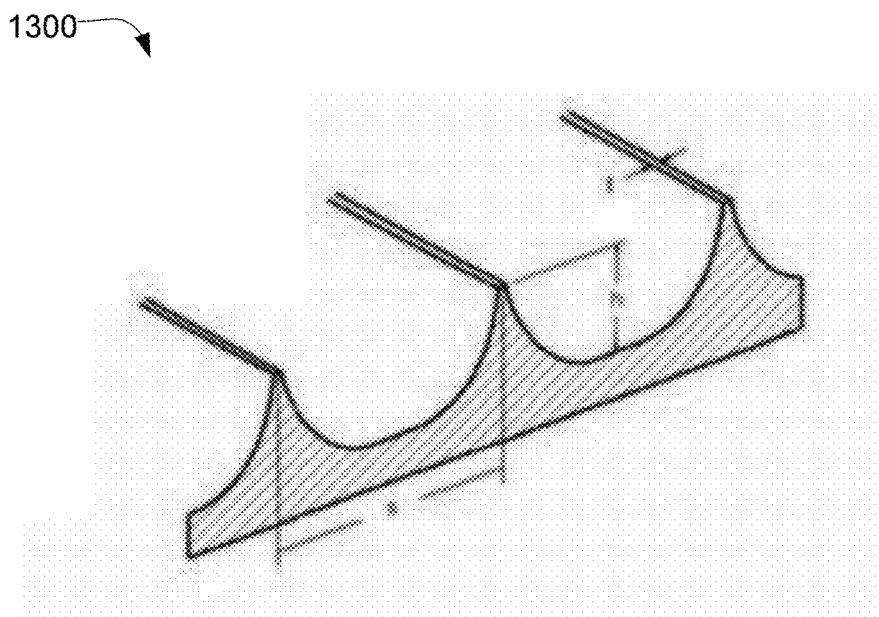

FIG. 13 illustrates example scalloped riblets 1300 that can be used to implement the example actuatable riblets disclosed herein. In this example, "s" refers to the distance between riblet peaks, "h" refers to the height of the riblet and "t" refers to the distance between the riblets. In some examples, "s" is between about 10 and 30 micrometer (μm), t/s is between about 0.02 and 0.04 and h/s is between about 0.05 and 1.0.

Figure 14:
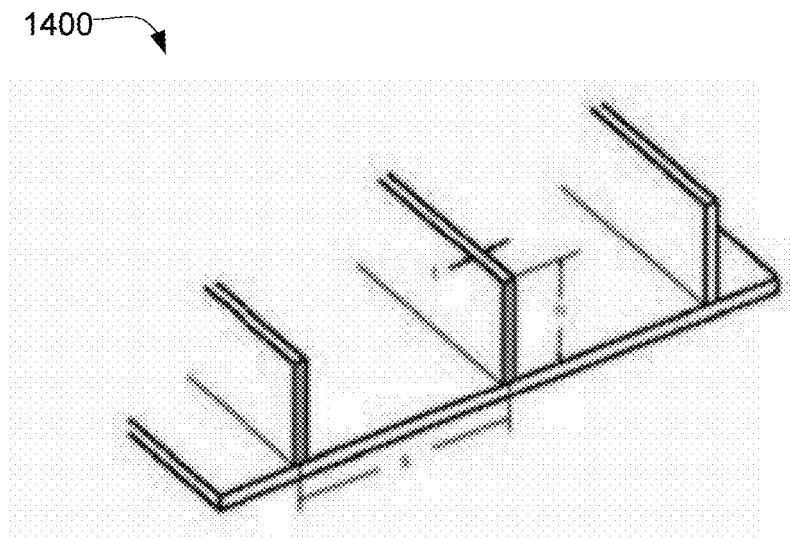

FIG. 14 illustrates example blade riblets 1500 that can be used to implement the example actuatable riblets disclosed herein. In this example, "s" refers to the distance between riblet peaks, "h" refers to the height of the riblet and "t" refers to the distance between the riblets. In some examples, "s" is between about 10 and 30 micrometer (μm), t/s is between about 0.02 and 0.04 and h/s is between about 0.02 and 0.8.

Figure 15:
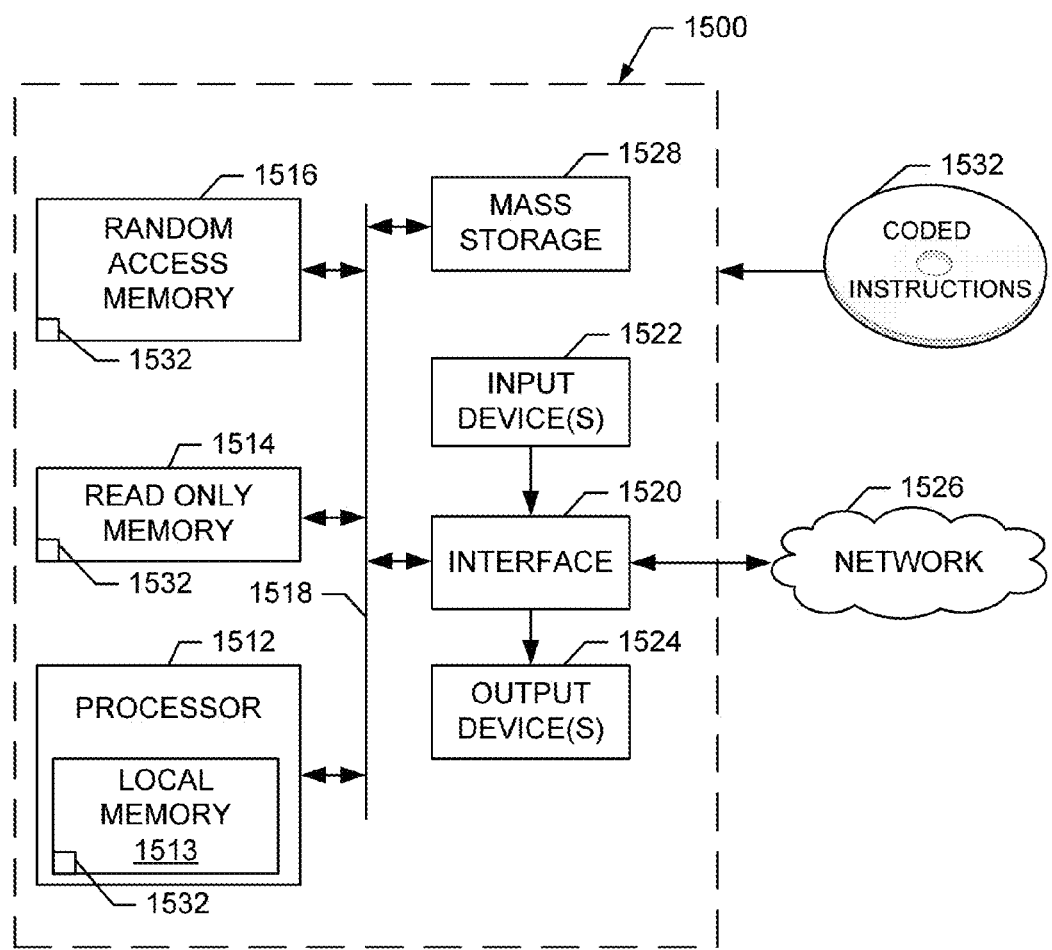
FIG. 15 is a processor platform that may execute the instructions to implement the processes of FIGS. 7-11 and, more generally, the examples disclosed herein.

FIG. 15 is a block diagram of an example processor platform 1500 capable of executing instructions to implement the methods of FIGS. 7-11 to produce the examples disclosed herein. The processor platform 1500 can be, for example, a server, a personal computer, a mobile device (e.g., a cell phone, a smart phone, a tablet such as an iPad™), a personal digital assistant (PDA), an Internet appliance, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.)

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

Coded instructions 1532 to implement the methods of FIGS. 7-11 may be stored in the mass storage device 1528, in the volatile memory 1514, in the non-volatile memory 1516, and/or on a removable tangible computer readable storage medium such as a CD or DVD.

From the foregoing, it will be appreciated that the disclosed methods, apparatus and articles of manufacture relate to actuatable microstructures such as riblets. For example, the example riblets may be associated with a coated skin surface (e.g., an aircraft skin surface, a submarine skin surface) that provides a low aerodynamic drag riblet surface pattern that passively distorts and/or actuates based on a pressure differential across an exterior surface of the riblet and/or in response to a change in atmospheric pressure as the aircraft changes cruise altitude and/or in response to a change in atmospheric pressure as the submarine changes depth. In some examples, a temperature change further facilitates the actuation of the example riblets.

In some examples, the example riblets are formed using a sheet that defines aligned and/or substantially parallel micro-channel slots that are over coated with an elastomeric film having, in some examples, a varying thickness pattern to substantially ensure actuation. In operation and based on a pressure differential across the elastomeric film, the elastomeric film deforms and/or distorts to define the riblet. When the pressure differential across the elastomeric film decreases and/or the pressure outside of the channel is substantially similar to the pressure within the channel, the riblet retracts enabling the example riblets to be substantially self-cleaning and/or self-clearing while substantially reducing the likelihood of the example riblets being damaged. While the sheets having the example riblets may be coupled to a vehicle surface (e.g., an aircraft surface) in any suitable way, in some examples, an interior surface of the sheets have a pressure sensitive adhesive (e.g., a coating) to enable the sheets to adhere to the vehicle (e.g., an aircraft).

In some examples, a method includes passively distorting dimensions of an aircraft skin surface texture based on aircraft pressure altitude. In some examples, a method includes passively distorting dimensions of an aircraft skin to form a relatively low aerodynamic drag riblet surface pattern in response to differential changes in atmospheric pressure as the aircraft changes cruise altitude.

In some examples, a sheet has a cross-section having aligned micro-channel slots over coated with an elastomeric film. In some examples, the elastomeric film enables riblets to deploy in response to a reduction in an atmospheric pressure. In some examples, the elastomeric sheet has a reduced thickness adjacent a middle of the respective micro-channel slots and an increased thickness adjacent side walls that define the channel and/or an increased thickness adjacent edges that define the channel. In some examples, the elastomeric film enables riblets to relax and/or be in a non-deployed position in response to an increase in an atmospheric pressure. In some examples, when the riblets relax and/or are in the non-deployed positioned, the sheets on which the riblets are formed are substantially self-cleaning. In some examples, the actuatability of the example riblets disclosed herein enables the example riblets to be less susceptible to damage as opposed to riblets that are relatively more fragile and/or are non-actuatable.

Some materials that may be used to implement the examples disclosed herein include, without limitation, thermoplastic elastomeric materials, such as DuPont Hytrel® a thermoplastic polyether-ester block copolymer, available from DuPont, DAI-EL™ thermoplastic T-530, a thermoplastic fluoroelastomer, available from Daikin, and HIPEX®, available from Kraiburg. Additionally or alternatively, some materials that may be used to implement the examples disclosed herein include, without limitation, thermoset materials, such as Butyl Ethylene Propylene (EPDM), Flouro-carbon (FKM), Neoprene (CR), Nitrile Butadiene (NBR), Silicone (VMQ), Styrene Butadiene (SBR), Urethane, or curing agent activated fluoroelastomers such as DAI-EL G558 available from Daikin Industries LTD. Some materials that may be used to implement the examples disclosed herein include, without limitation, fiber reinforce materials such as, for example, carbon fiber, fiber glass, Nomex and Kevlar. While the example riblets disclosed herein may have any shape and/or size, in some examples, when the riblets are deployed during a cruise phase of a flight in which the atmospheric pressure drops, the example riblets have a cross-section of approximately a 0.0015 inch triangle (e.g., an isosceles triangle) having a thirty degree angle and are spaced apart approximately 0.003 inches.

An example apparatus includes a sheet including a first side including an elastomeric material and a second side opposite the first side. The sheet defines sealed channels. In response to a pressure differential across the elastomeric material, the elastomeric material is to be in a deformed position relative to the sealed channels to define microstructures. In some examples, the apparatus includes an adhesive on the second side to enable the sheet to be adhered to a vehicle. In some examples, the vehicle is an aircraft. In some examples, the vehicle is an underwater craft.

In some examples, the sheet includes a first layer and a second layer coupled to define the channels. In some examples, the first layer includes a first material and the second layer comprises a second material, the first material being different than the second material. In some examples, when a pressure differential across the elastomeric material is below a threshold value, the elastomeric material is to be in a non-deformed position relative to the sealed channels. In some examples, when the elastomeric material is in the deformed position relative to the sealed channels, a portion of the elastomeric material is displaced away from the first side. In some examples, when the elastomeric material is in the deformed position relative to the sealed channels, a portion of the elastomeric material is displaced toward the first side. In some examples, the sealed channels are hermetically sealed channels. In some example, the microstructures include actuatable microstructures. In some examples, the microstructures are passively actuatable microstructures. In some examples, the sealed channels are substantially parallel to one another. In some examples, the elastomeric material is a first thickness adjacent a middle of each of the channels and a second thickness adjacent edges of each of the channels. In some examples, the first thickness is less than the second thickness.

An example method includes exposing a sheet defining sealed channels to a pressure differential and enabling the sealed channels to define microstructures in response to the pressure differential. In some examples, the sheet includes a first side including an elastomeric material and a second side opposite the first side. In some examples, in response to the pressure differential across the elastomeric material, further including enabling the elastomeric material to move to a deformed position to define microstructures. In some examples, prior to exposing the sheet to the pressure differential, further comprising adhering the sheet to a vehicle. In some examples, the vehicle is an airplane.

An example method includes forming sealed channels in a sheet, the sheet comprising a first side includes an elastomeric material and a second side opposite the first side. In response to a pressure differential across the elastomeric material, the elastomeric material is to be in a deformed position relative to the sealed channels to define microstructures. In some examples, forming the sealed channels comprises defining a portion of the channels in a first layer and coupling a second layer to the first layer. In some examples, the second layer is the first side. In some examples, forming the sealed channels includes implanting a foaming agent within the sheet and activating the foaming agent to form the sealed channels. In some examples, the method includes applying an adhesive layer to the second side.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a sheet comprising a first side comprising an elastomeric material and a second side opposite the first side, the sheet defining sealed channels including gas, in response to a pressure differential across the elastomeric material and without changing an amount of gas contained within the sealed channels, the elastomeric material to be in a deformed position relative to the sealed channels to define microstructures.

2. The apparatus of claim 1, further comprising an adhesive on the second side to enable the sheet to be adhered to a vehicle.

3. The apparatus of claim 2, wherein the vehicle comprises an aircraft and the sheet is coupled to a surface of the aircraft.

4. The apparatus of claim 2, wherein the vehicle comprises an underwater craft and the sheet is coupled to a surface of the underwater craft.

5. The apparatus of claim 1, wherein the sheet comprises a first layer and a second layer coupled to define the sealed channels.

6. The apparatus of claim 5, wherein the first layer comprises a first material and the second layer comprises a second material, the first material being different than the second material.

7. The apparatus of claim 1, wherein when the pressure differential across the elastomeric material is below a threshold value, the elastomeric material is to be in a non-deformed position relative to the sealed channels.

8. The apparatus of claim 1, wherein when the elastomeric material is in the deformed position relative to the sealed channels, a portion of the elastomeric material is displaced away from the second side.

9. The apparatus of claim 1, wherein when the elastomeric material is in the deformed position relative to the sealed channels, a portion of the elastomeric material is displaced toward the second side.

10. The apparatus of claim 1, wherein the microstructures comprise actuatable microstructures.

11. The apparatus of claim 10, wherein the microstructures comprise passively actuatable microstructures.

12. The apparatus of claim 1, wherein the sealed channels are substantially parallel to one another.

13. The apparatus of claim 1, wherein the elastomeric material comprises a first thickness adjacent a middle of each of the sealed channels and a second thickness adjacent edges of each of the sealed channels.

14. The apparatus of claim 13, wherein the first thickness is less than the second thickness.

15. The apparatus of claim 1, wherein the sheet includes a single layer having the sealed channels.

16. The apparatus of claim 1, wherein cross-sections of the sealed channels change when the elastomeric material is in the deformed position.

17. The apparatus of claim 1, wherein the channels define the microstructures.

18. The apparatus of claim 1, wherein the channels are void of other structures to enable the elastomeric material to be in the deformed position relative to the sealed channels to define microstructures in response to the pressure differential across the elastomeric material.

19. An apparatus, comprising:
a sheet comprising a first side comprising an elastomeric material and a second side opposite the first side, the sheet defining hermetically sealed channels, in response to a pressure differential across the elastomeric material, the elastomeric material to be in a deformed position relative to the sealed channels to define microstructures based on the inclusion of gas within the sealed channels.

20. A method, comprising:
exposing a sheet to a pressure differential, the sheet including a single layer defining sealed channels; and
enabling the sealed channels to define microstructures in response to the pressure differential based on the inclusion of gas within the sealed channels.

21. The method of claim 20, wherein the sheet includes a first side comprising an elastomeric material and a second side opposite the first side.

22. The method of claim 21, wherein, in response to the pressure differential across the elastomeric material, further comprising enabling the elastomeric material to move to a deformed position to define microstructures.

23. The method of claim 20, wherein prior to exposing the sheet to the pressure differential, further comprising adhering the sheet to a vehicle.

24. The method of claim 23, wherein the vehicle is an airplane.

* * * * *